United States Patent
De Gaillard et al.

(10) Patent No.: US 6,682,134 B2
(45) Date of Patent: Jan. 27, 2004

(54) GUIDE DEVICE FOR A COVER OF A MOTOR VEHICLE ROOF

(75) Inventors: Francois De Gaillard, Mouilleron en pareds (FR); Martin Pollak, Puchheim (DE); Wofgang Ettl, Graefelfing (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/238,885

(22) Filed: Sep. 11, 2002

(65) Prior Publication Data

US 2003/0080591 A1 May 1, 2003

(30) Foreign Application Priority Data

Sep. 12, 2001 (DE) .......................................... 101 44 980

(51) Int. Cl.⁷ ................................................. B60J 7/047
(52) U.S. Cl. ................................................. 296/216.03
(58) Field of Search ....................... 296/216.03, 220.01

(56) References Cited

U.S. PATENT DOCUMENTS 4,730,868 A * 3/1988 Niwa .................... 296/216.03

6,547,319 B1 * 4/2003 Huyer ................... 296/216.03

FOREIGN PATENT DOCUMENTS

| EP | WO 00/51835 | 9/2000 | |
| JP | 362091315 | * 4/1987 | ............ 296/216.03 |

OTHER PUBLICATIONS

Patent Abstracts of Japan, vol. 006, No. 216 (M–168), Oct. 29, 1982 & JP 57 121924 A (Nissan Jidosha KK), Jul. 29, 1982—English Abstract.

* cited by examiner

Primary Examiner—Dennis H. Pedder
(74) Attorney, Agent, or Firm—Nixon Peabody LLP; David S. Safran

(57) ABSTRACT

A guide device for guiding the raising and opening of a cover of a vehicle roof to be opened is provided. The guide device includes at least two guide profiles which can be moved against one another to move the cover over a roof surface adjoining behind a roof opening which can be closed by the cover. At least one of the guide profiles of the guide device, or at least a section of one of the guide profiles, having a curvature pointed toward the roof surface in order to lower the cover toward the roof surface as the cover is shifted to the rear by via the guide profiles.

9 Claims, 4 Drawing Sheets

GUIDE DEVICE FOR A COVER OF A MOTOR VEHICLE ROOF

BACKGROUND OF THE INVENTION

1. Technical Field

The present invention relates to a guide device for a cover of a vehicle roof to be opened. The guide device functions for raising the cover and for moving the raised cover by means of at least two guide profiles which can be moved against one another over a roof surface adjoining behind the roof opening which can be closed by the cover.

2. Description of Related Art

International Patent publication WO 00/51835 discloses one such guide device for moving a raised cover over a roof surface which adjoins to the rear. On either side of a roof opening the device contains three telescoping guide profiles or guide rails each, by means of which the raised cover can be pushed to the rear over the roof surface which adjoins to the rear in a plane which is fixed by the linearly movable guide rails. The cover which has been moved to the rear thus stands distinctly beyond the roof surface to the top, especially when the roof surface declines to the rear.

SUMMARY OF THE INVENTION

One object of the present invention is to provide a guide device which enables matching of the position of the cover, which can be moved to the rear above the roof surface, to the roof surface.

This object and other objects are achieved by providing a guide device having guide profiles wherein at least one of the guide profiles of the guide device, at least in sections, has a curvature pointed toward the roof surface, in order to lower the cover, which can be shifted to the rear by means of the guide profiles, toward the roof surface. In this way, at least one guide profile, which can be moved to the rear during its overall motion or at least during one segment of its path of motion, is moved down such that the cover is likewise lowered toward the roof surface. Since the cover is raised less over the roof surface than prior covers, the present invention results in less air resistance and wind noise.

The guide profiles or guide rails can be made such that the section which has the curvature is formed on the back end of the front guide profile and/or on the back end of a middle guide profile and/or on the front end of the rear guide profile. In a short curved section, the lowering motion of the cover approaches a swiveling motion.

In one preferred embodiment, the guide device has a front guide lever which is pivotally supported on the roof side, a middle drive rail which is movably supported thereon, and a rear carrier profile of the cover which is movably supported on the drive rail, all of which are formed with an especially coincident line of curvature for the displacement motion of the cover. The three carrier profiles for a short closing arrangement have a comparatively long displacement path which makes available an especially uniform lowering motion of the cover.

Preferably the guide lever, the drive rail and the carrier profile of the cover are supported to telescope onto one another, especially in a mutually enveloping arrangement of the three guide profiles. But at least two and also four guide profiles can also be arranged next to one another such that a nonuniform or variable radius of curvature can be formed. A uniform curvature has a radius of curvature of, for example, 300 to 350 cm. Depending on the configuration of the vehicle roof, it can even be different.

DETAILED DESCRIPTION OF THE PREFERRED EMBODIMENTS

Figure 1:
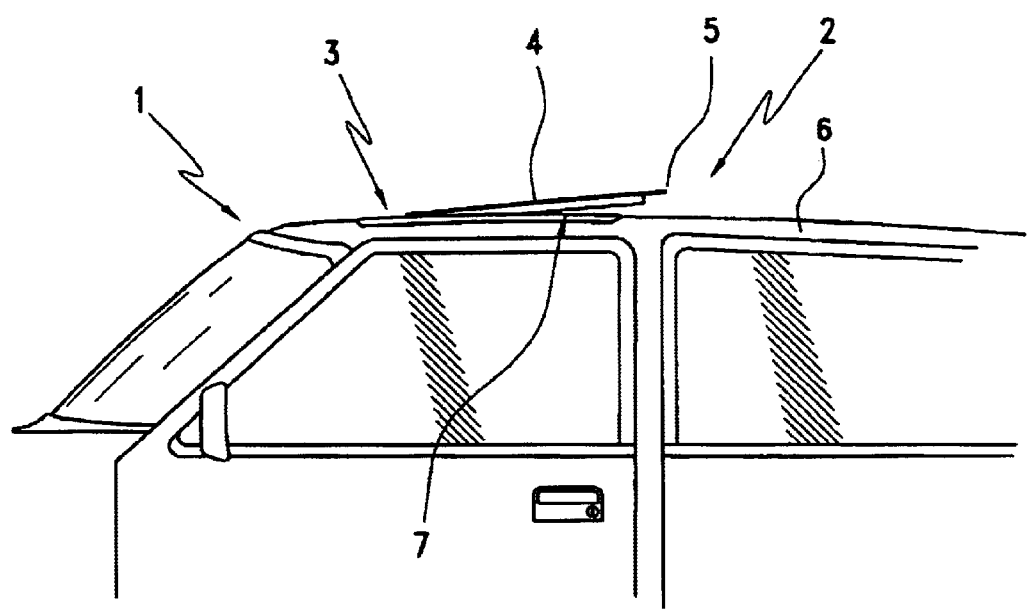
FIG. 1 shows a side view, partial representation of a motor vehicle with a cover raised by means of the guide device of the present invention.

An automobile 1 contains a vehicle roof 2 (FIG. 1) with a roof opening 3 and a cover 4 with which the roof opening 3 can be closed. The cover 4 can be raised in the manner of a spoiler cover or the cover of a lifting-sliding roof with its rear edge 5 and moved to the rear over the fixed roof surface 6. The cover 4 is supported on both sides with a raising and guide device 7 (FIGS. 2 and 3) including a front guide lever 8, a middle drive rail 9 and a rear carrier profile 10 in a telescoping arrangement which can be moved against one another. The guide lever 8 on its front end 11 on the side frame of the roof opening 3 is mounted by means of a swivel joint to be able to swivel around a roof-mounted transverse axis 12. The drive rail 9 has an essentially U-shaped cross section and extends around the guide lever 8 from overhead. The carrier profile 10 likewise has an essentially U-shaped cross section and extends around the drive rail 9 from overhead. The cover 4 is securely mounted on the carrier profile 10.

A raising mechanism for the guide lever 8 contains a carriage 13 movably supported in the lengthwise direction on a guide 14 attached to a frame located laterally of the roof opening 3, as well as a front raising lever 15 and a rear raising lever 16. The front raising lever 15 is mounted on one side on the carriage 13 to be able to swivel around the axis 17 and on the other is movably supported on a lengthwise guide 18 which is formed on the guide lever 8. The rear raising lever 16 is on the one hand supported on the carriage 13 to be able to swivel around the axis 19 and on the other hand is pivotally supported on a locking part or sliding part 20 which in turn is movably supported on the drive rail 9.

Figure 2:
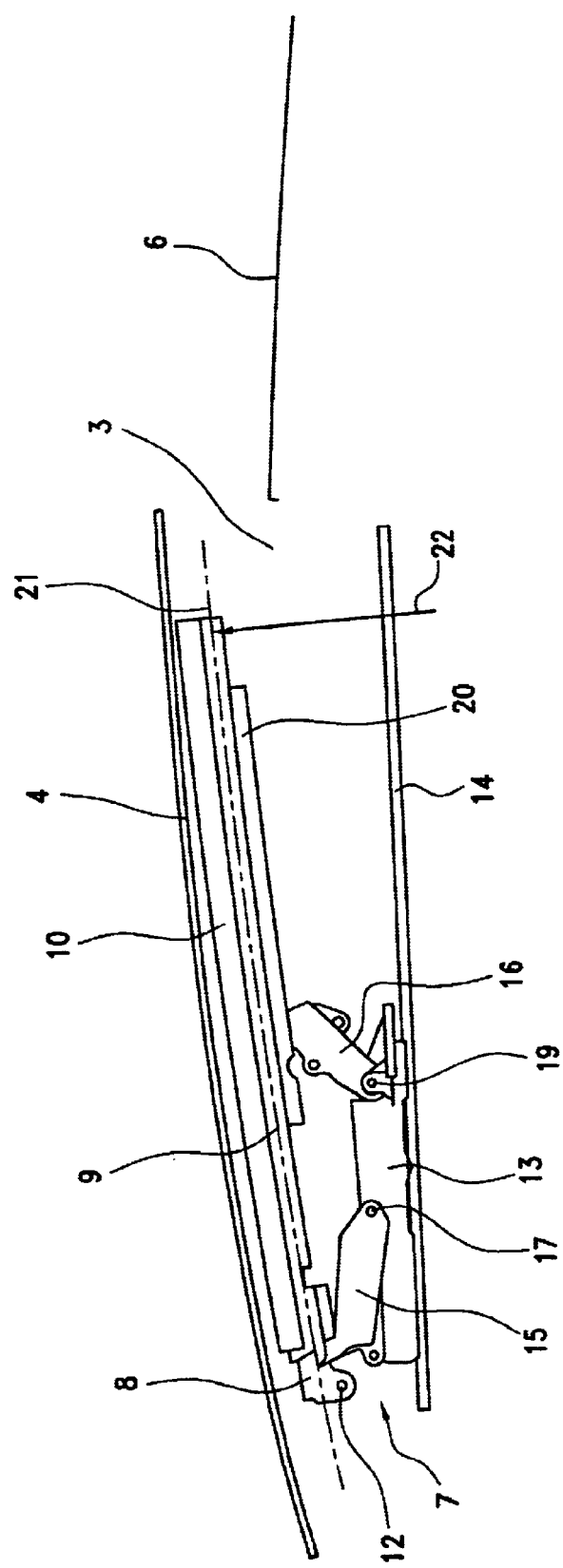
FIG. 2 shows a side, schematic view of the guide device of the present invention with the cover raised.
Figure 3:
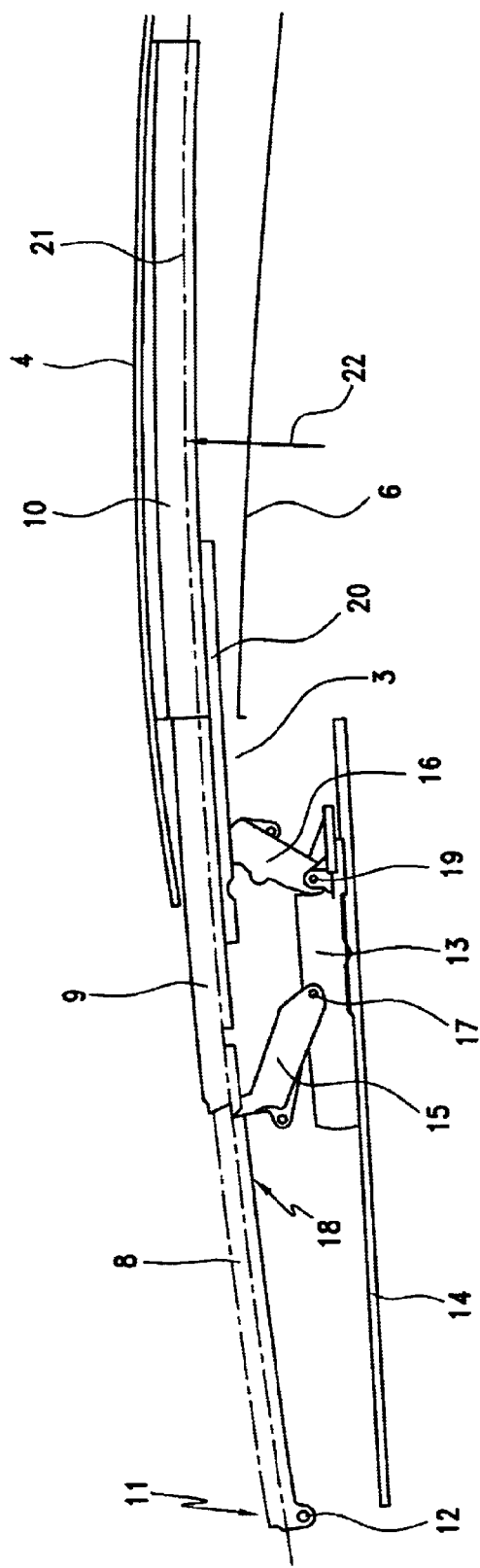
FIG. 3 shows a side, schematic view of the guide device of FIG. 2 with the raised cover pushed to the rear.

A flexible tension/compression element (not shown) is attached, on the one hand, to the guide lever 8, deflected on the drive rail 9 and, on the other hand, is attached to the carrier profile 10 so that when the drive rail 9 is moved relative to the guide lever 8, the carrier profile 10 is pushed on the drive rail 9. To raise the cover 4, the carriage 13 is pushed to the rear via a drive cable along the guide 14. The rear raising lever 16, which is being raised in a controlled manner, lifts the drive rail 9 and thus at the same time swivels the guide lever 8 around the transverse axis 12 (FIG. 2). To move the raised cover 4 back, the carrier 13 is pushed further to the rear by means of the rear raising lever 16 via the sliding part 20; the drive rail 9, and via the tension/ compression element, also the carrier profile 10 being pushed to the rear. The front raising lever 15 slides at the same time in the lengthwise guide 18 on the guide lever 8.

Figure 4:
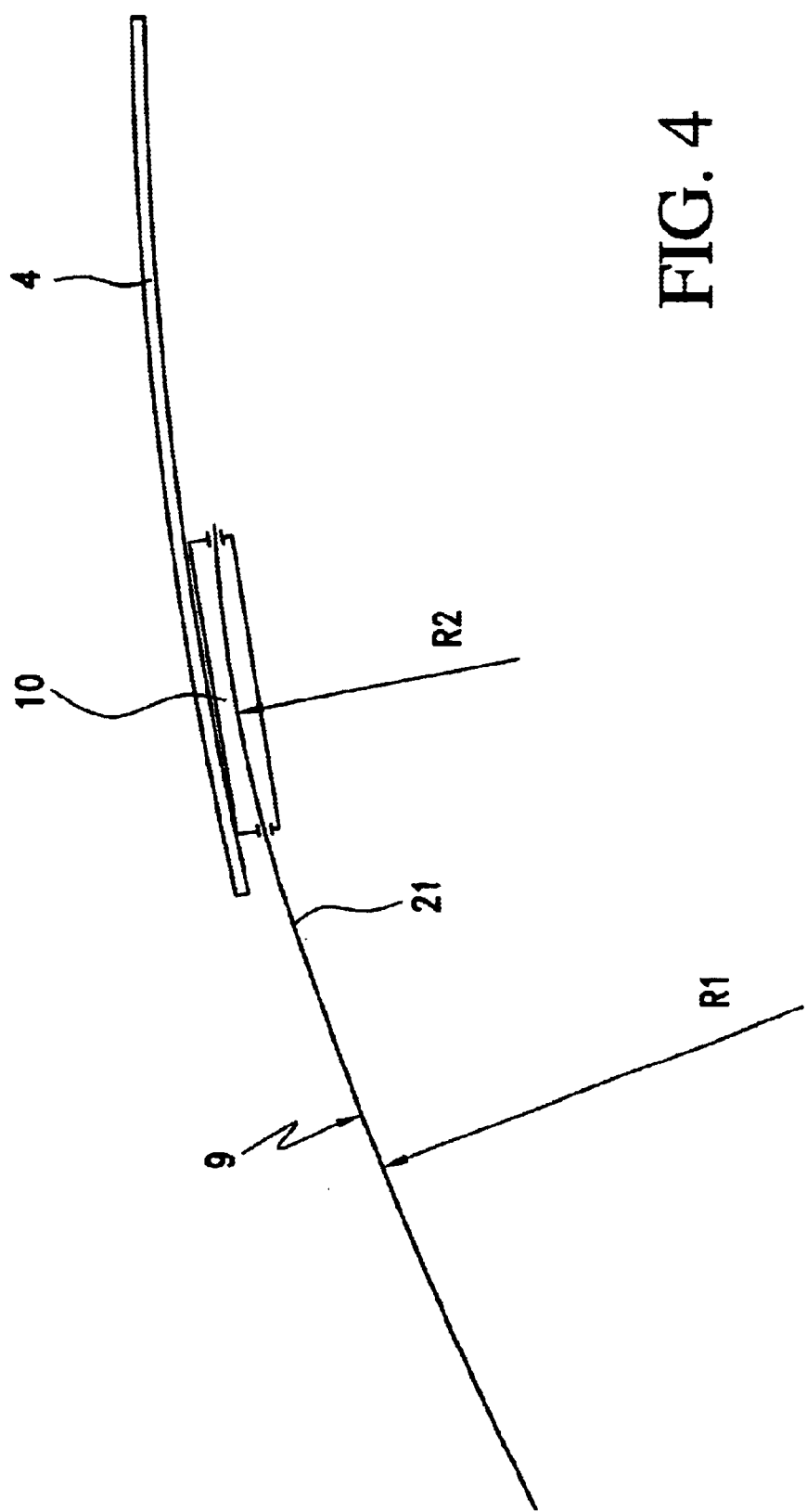
FIG. 4 shows a side, schematic view of the cover and carrier profile with a drive rail having a variable radius of curvature.

The above-described device corresponds in its structure and manner of operation basically to the device disclosed in International Patent publication WO 00/51835. In contrast to this known device however, the guide device of the present invention includes the guide lever 8, the drive rail 9 and the carrier profile 10 formed in the lengthwise direction with a curvature such that they move with telescoping in and out on the corresponding curved 7 path of motion or line 21 of curvature with a radius of curvature 22 which is, for example, 300 cm, such that the center point of the curvature is located underneath the vehicle roof. In this way, the cover 4, while it is being pushed to the rear in its spoiler position over the adjoining roof surface 6, is lowered toward the roof surface 6. In doing so, the cover 4 approaches the roof surface 6, or moves not as far away from the roof surface as in the known prior telescoping extension with straight guide rails. The curvature of the telescoping device which contains the guide lever 8, the drive rail 9 and the carrier profile 10 can be formed with a smaller radius of curvature so that the cover 4 clearly approaches the roof surface 6 for a roof surface 6 which is curved down to the rear. Also, the radius of curvature of at least one of the guide profiles or a section of one of the guide profiles may be formed with a variable radius of curvature. For example as shown in FIG. 4, the drive rail 9 may be formed with a first radius of curvature R1 for a portion of the rail and a second radius of curvature R2 for another portion of the rail, where R1>R2. Alternatively, the guide profiles or guide rails can be made such that the section which has the curvature is formed on the back end of the front guide profile and/or on the back end of a middle guide profile and/or on the front end of the rear guide profile. In a short curved section, the lowering motion of the cover approaches a swiveling motion.

We claim:

1. A guide device for guiding a raising of a cover and for moving the raised cover of a vehicle roof formed of a roof surface having a roof opening closeable by the cover, comprising:

at least two guide profiles which are moveable relative to one another to move the cover over the roof surface which adjoins behind the roof opening, the guide profiles permitting the cover to be shifted toward a rear of the roof surface; wherein at least one of the guide profiles of the guide device includes a curvature on only a section thereof, said curvature being pointed toward the roof surface to lower the cover toward the roof surface during the shifting of the cover toward the rear of the roof surface, and wherein the at least two guide profiles include a front guide profile, a middle guide profile and a rear guide profile, the section of the at least one profile which includes the curvature being one or more of the back end of the front guide profile, the back end of the middle guide profile and the front end of the rear guide profile.

2. The guide device of claim 1, wherein the guide device includes a front guide lever pivotally supported on a roof side, a middle drive rail movably supported on the front guide lever, and a rear carrier profile of the cover which is movably supported on the drive rail, the front guide lever, middle drive rail and rear carrier profile being formed with a coincident line of curvature for the displacement motion of the cover.

3. The guide device of claim 2, wherein the guide lever, the drive rail and the carrier profile of the cover and supported to telescope onto one another.

4. The guide device of claim 1, wherein a radius of the curvature has a length in the range from 300 to 350 cm.

5. A guide device for guiding a raising of a cover and for moving the raised cover of a vehicle roof formed of a roof surface having a roof opening closeable by the cover, comprising:

at least two guide profiles which are moveable relative to one another to move the cover over the roof surface which adjoins behind the roof opening, the guide profiles permitting the cover to be shifted toward a rear of the roof surface;

wherein at least a section of one of the guide profiles of the guide device includes a curvature pointed toward the roof surface to lower the cover toward the roof surface during the shifting of the cover toward the rear of the roof surface; and wherein the curvature of the section or profile has a variable radius of curvature.

6. A vehicle roof, comprising:

a roof surface having a roof opening;

a cover for closing and opening the roof opening; and a guide device for guiding a raising of the cover and for moving the raised cover toward a rear of the roof surface, said guide device including at least two guide profiles moveable against one another to move the cover over the roof surface which adjoins behind the roof opening, the guide profiles permitting the cover to be shifted toward the rear of the roof surface; wherein at least one of the guide profiles of the guide device a includes a curvature on only a section thereof, said curvature being pointed toward the roof surface to lower the cover toward the roof surface during the shifting of the cover toward the rear of the roof surface, and wherein the at least two guide profiles include a front guide profile, a middle guide profile and a rear guide profile, the section of the at least one profile which includes the curvature being one or more of the back end of the front guide profile, the back end of the middle and profile and the front end of the rear guide profile.

7. The vehicle roof of claim 6, wherein the guide device includes a from guide lever pivotally supported on a roof side, a middle drive rail movably supported on the front guide lever, and a rear carrier profile of the which is movable supported on the drive rail, the front guide lever, middle drive rail and rear carrier profile being formed with an especially coincident line of curvature for the displacement motion of the cover.

8. The vehicle rook of claim 7, wherein the guide lever, drive rail and the carrier profile of the cover are supported to telescope onto one another.

9. The vehicle roof of claim 6, wherein a radius of the curvature has a length in the range from 300 to 350 cm.

* * * * *